United States Patent [19]

McConnell et al.

[11] 4,112,208

[45] Sep. 5, 1978

[54] PEROXIDE TREATED SUBSTANTIALLY AMORPHOUS POLYOLEFINS USEFUL AS PRESSURE-SENSITIVE ADHESIVES

[75] Inventors: Richard L. McConnell, Kingsport; Doyle A. Weemes, Greeneville, both of Tenn.

[73] Assignee: Eastman Kodak Company, Rochester, N.Y.

[21] Appl. No.: 813,375

[22] Filed: Jul. 6, 1977

[51] Int. Cl.$^2$ .............................................. C08F 8/06
[52] U.S. Cl. ...................................... 526/57; 526/19; 526/22; 526/348; 526/348.1; 526/348.6; 526/351
[58] Field of Search ......................................... 526/57

[56] References Cited

U.S. PATENT DOCUMENTS

| | | | |
|---|---|---|---|
| 3,012,020 | 12/1961 | Kirk et al. | 526/57 |
| 3,449,191 | 6/1969 | Taylor | 526/57 |

FOREIGN PATENT DOCUMENTS 885,970   1/1958   United Kingdom .................... 526/57

*Primary Examiner*—William F. Hamrock
*Attorney, Agent, or Firm*—Clyde L. Tootle; Daniel B. Reece, III

[57] ABSTRACT

The invention relates to a process for the treatment of substantially amorphous polyolefins with peroxides at high temperatures to provide permanently tacky, low viscosity materials which have useful pressure-sensitive adhesive properties. These permanently tacky amorphous polyolefin homo- and copolymers, as well as blends of such amorphous polyolefins with crystalline polyolefins containing up to 20 weight percent crystalline polyolefin, are novel pressure-sensitive adhesives. These permanently tacky polymers are obtained, for example, by treating substantially amorphous polyolefins, such as amorphous polypropylene or amorphous propylene/1-butene copolymers, with peroxides at high temperatures.

12 Claims, No Drawings

PEROXIDE TREATED SUBSTANTIALLY AMORPHOUS POLYOLEFINS USEFUL AS PRESSURE-SENSITIVE ADHESIVES

This invention relates to peroxide treated substantially amorphous polyolefin compositions having a novel combination of properties. More specifically, the invention relates to peroxide treated substantially amorphous polyolefins which provide pressure-sensitive adhesive compositions having permanent tackiness.

Pressure-sensitive adhesive (PSA) products have experienced a rapid growth rate in recent years because of their ease of application. Typical pressure-sensitive adhesive applications include, for example, tapes (consumer, industrial, and surgical), labels, decals, films, floor tile and wall and shelf coverings. Until recently, virtually all pressure-sensitive compositions were based on blends of high molecular weight synthetic and natural rubbers with tackifiers. Frequently fillers such as zinc oxide or magnesium oxide are used in PSA formulations which are applied to opaque backing substrates. Typical backing materials include paper, cellophane, plasticized poly(vinyl chloride), polyester film cellulose acetate film, cloth, foamed polymers (e.g., foamed polystyrene or polypropylene), metal foils, felt, cork and the like. Although PSA compositions have generally been applied to the backings from solvents, there is a need for PSA materials which can be applied as hot melts to eliminate solvent pollution during manufacturing of the products. Also, a non-solvent adhesive is desirable since many solvents are in short supply.

In polymerization processes for polymerizing propylene using a wide variety of catalysts, some product is formed which is hexane soluble which has been defined as amorphous polypropylene. This material, however, may contain small fractions which are crystalline. This amorphous polypropylene, when solidified from the melt, is initially tacky and has some pressure-sensitive tack. However, on standing it loses this surface tackiness, due to crystallization of the crystallizable fraction. These materials for the purpose of this invention are defined as substantially amorphous polyolefins.

Substantially amorphous polypropylene provides a good hot melt adhesive when used alone or blended with other materials. These substantially amorphous polyolefins are also useful in the lamination of paper-to-paper, paper to foil and the like when used as a hot melt adhesive. These substantially amorphous polyolefins, however, are not useful as pressure-sensitive adhesives as they lose their tackiness after solidifcation. For example, substantially amorphous polypropylene begins to lose its surface tack within six minutes after solidifying from the melt due to crystallization of a polymer fraction. After about three hours the substantially amorphous polypropylene has become virtually nontacky. Therefore, it would be an advance in the state of the art to provide a permanently tacky substantially amorphous polyolefin which can be used as a pressure-sensitive adhesive.

Accordingly, it is one of the objects of this invention to provide a novel pressure-sensitive adhesive.

Another and further object of this invention is to provide a pressure-sensitive adhesive having good adhesive properties which can be applied without the use of a solvent.

A still further object of the invention is to provide an adhesive prepared from a substantially amorphous polyolefin composition which is tacky at ambient temperatures.

Another and still further object of this invention is a process for preparing the permanently tacky amorphous polyolefin compositions useful as pressure sensitive adhesives.

A still further object of the invention is the use of these permanently tacky amorphous polyolefins as pressure-sensitive adhesives.

In accordance with the present invention we have found that a substantially amorphous polyolefin, such as amorphous polypropylene, can be treated with peroxides at 150° to 250° C. to provide a low viscosity, permanently tacky, hot-melt pressure-sensitive adhesive composition. This peroxide treatment renders the substantially amorphous polyolefin permanently tacky. Substantially amorphous polyolefins useful in the practice of this invention include substantially amorphous homopolymers of 1-olefins containing 3 to 5 carbon atoms, substantially amorphous copolymers prepared from ethylene and 1-olefins containing 3 to 5 carbon atoms, and substantially amorphous propylene or 1-butene/higher 1-olefin copolymers containing less than 40 mole percent of at least one higher 1-olefin of the group 1-hexene, 1-heptene, 1-octene, 1-nonene, and 1-decene. In defining these polymeric compositions it should be noted that the term amorphous as used herein defines a polymeric composition that may contain a small amount of crystallizable portion. Also, these substantially amorphous polyolefins can be used as a blend with crystalline polyolefins. The crystallizable polymer component of these blends, however, should not exceed about 20% crystalline polymer.

The melt viscosity of the substantially amorphous polyolefin materials is generally in the range of about 100 to 200,000 cp at 190° C. while the peroxide-treated products of this invention generally have melt viscosities of about 30 to about 50,000 cp at 190° C. (determined by ASTM D1238). Thus, the peroxide treatment causes a decrease in the melt viscosity of the substantially amorphous polyolefin and this treatment also imparts permanent tack to the amorphous polyolefin composition. The reaction conditions required to achieve this result are somewhat limited. For example, the peroxide concentration can range from about 2 to about 25 weight percent (based on the amorphous polymer) with a preferred peroxide concentration range of about 3 to 20 weight percent. The peroxide treatments are generally conducted in the range of about 150° to 250° C., preferably 175° to 225° C. The reaction time may vary from a few minutes to several hours depending on the temperature used and the half life of the peroxide being used. For example, in using (Lupersol 101) 2,5-dimethyl-2,5-di(tertiarybutyl peroxy) hexane, reaction temperatures of about 190 to about 210° C. are highly suitable. At a temperature of 190° C., the 2,5-dimethyl-2,5-di(tertiarybutyl peroxy) hexane has a half life of about 0.24 minutes.

One substantially amorphous polyolefin useful in this invention is the essentially noncrystalline hexane soluble polyolefins, such as the substantially amorphous polypropylene, formed in minor amounts during the production of crystalline polypropylene by the polymerization of propylene in the presence of stereospecific catalysts by a process as disclosed in U.S. Pat. No. 3,679,775, incorporated herein by reference. The solid substantially amorphous polypropylene has a viscosity of about 1,000 to about 50,000 centipoise at 190° C.

(ASTM D-1238), and preferably from about 1,500 to about 15,000 centipoise. The substantially amorphous polyolefin can be blended with crystalline, hexane insoluble polyolefin in an amount of up to about 20 percent by weight. One such commercially available amorphous polyolefin useful in preparing the pressure-sensitive adhesives is the Eastobond M-5 polyolefins available from Eastman Chemical Products, Inc. These substantially amorphous polymers can also be produced directly, i.e., without production of substantial amounts of crystalline copolymer by polymerizing a mixture of propylene and butene-1 in mineral spirits at a temperature of about 100° to about 180° C. and a pressure in the range of about atmospheric to about 2,000 psig. with the catalyst containing an organopolylithium aluminum compound and the HA or AA forms of titanium trichloride in a mole ratio of 0.01–0.05/0.1–1.0/1 by a polymerization process as disclosed in U.S. Pat. No. 3,679,775, which disclosure is incorporated herein by reference. Methods of preparation of the organopolylithium aluminum compounds are also disclosed in U.S. Pat. No. 3,679,775. These amorphous propylene-1-butene copolymers generally contain from about 30 percent to about 75 weight percent of butene-1, and have a melt viscosity of about 100 to 100,000 centipoise at 190° C., a solubility in refluxing hexane of at least 99 weight percent, a solubility in refluxing diethyl ether of at least 60 weight percent, a ring and ball softening point in the range of about 78° to 120° C., and a differential scanning calorimeter melting point not greater than 120° C. The substantially amorphous polyolefin could be degraded to the desired melt viscosity if one starts with a high molecular weight substantially amorphous polymer.

The substantially amorphous polyolefin component can also be a substantially amorphous, hexane soluble propylene-alpha-monoolefin copolymer. These substantially amorphous copolymers are formed in varying amounts during the production of crystalline propylene-alpha-monoolefin copolymers by stereospecific polymerization of propylene and a different alpha-monoolefin by a process as disclosed in U.S. Pat. No. 3,529,037, incorporated herein by reference. These substantially amorphous copolymers can also contain various amounts of hexane insoluble polymer up to an amount of about 20 weight percent.

The poly(propylene-co-higher 1-olefin) useful in the present invention is a substantially amorphous propylene/higher 1-olefin copolymer containing less than about 40 mole percent higher 1-olefin which is partially crystalline and has a melt viscosity range at 190° C. of 10,000 to 200,000 cp., a density of greater than 0.86, and a glass transition temperature (Tg) of about −15° to about −25° C., wherein said higher 1-olefin is a member of the group consisting of 1-hexene, 1-heptene, 1-octene, 1-nonene and 1-decene. The 1-butene/higher 1-olefin copolymers containing less than 40 mole percent higher 1-olefin are also useful in the practice of this invention. Such poly(propylene-co-higher 1-olefin) copolymers can be made according to the procedure in U.S. Pat. No. 3,954,697 by varying the amount of monomer in the polymerization reaction.

Peroxides useful in the present invention include, for example, ditertiarybutyl peroxide, 2,5-dimethyl-2,5-di(-tertiarybutylperoxy) hexane (Lupersl 101), dicumyl peroxide, and cumene hydroperoxide. In general, the alkyl peroxides such as ditertiarybutyl peroxide and the Lupersol 101 type materials are preferred in order to provide polymers having a high degree of tack.

Suitable reaction vessels include those made from glass or metal. For example, the reactions may be conducted in glass flasks, glass lined reactors, steel autoclaves, Brabender plastographs, Banbury mixers, and the like. The reactions may be conducted in the presence of air or under inert gases such as nitrogen. Although not required, it is also possible to carry out the peroxide treatment in the presence of an inert solvent such as benzene. The pressure-sensitive adhesives of this invention may be stabilized by the addition of conventional stabilizers for polyolefin materials such as dilauryl thiodipropionate, Plastanox 1212 (lauryl stearyl thiodipropionate), Irganox 1010 {(pentaerythritol tetrakis[3,(3,5-di-tert-butyl-4-hydroxyphenyl)propionate]}, Eastman Inhibitor DOPC (dioctadecyl p-cresol), Plastanox 2246 [2,2'-methylene bis(4-methyl-6-tert-butylphenol)], and Ethyl 702 [4,4'-methylene bis(2,6-di-tert-butylphenol)], or combinations of such stabilizers. Effective stabilizer concentrations may range from about 0.1 to about 0.5% by weight. For example, 0.25% Irganox 1010 or a combination of 0.25% Irganox 1010 with 0.25% Plastanox 1212 provides good melt viscosity and color stability when the adhesive is maintained in molten form at 350° F. for 8 hours or longer.

The adhesives of the invention may be used alone or in mixture with other materials such as polyethylene waxes, polypropylene waxes, amorphous polypropylene, amorphous block ethylene/propylene copolymer, paraffin, polyterpenes such as those commercially available and sold as "Nirez 1100", "Nirez 1135", "Piccolyte S10", "Piccolyte 40", "Piccolyte 100", or "Piccolyte 135"; hydrocarbon resins such as "Piccopale 85", "Piccapale 100", "Staybelite" or DAC-B hydrocarbon resin, rubber components such as ethylene/propylene copolymers, styrene/butadiene (or isoprene) block copolymers, and styrene/butadiene copolymers and the like.

Small amounts of pigments, colorants, and other additives may be added to the peroxide-treated polyolefins as desired.

This invention can be further illustrated by the following examples although it will be understood that these examples are included merely for purposes of illustration and are not intended to limit the scope of the invention.

EXAMPLE 1

About 45 grams of low viscosity substantially amorphous polypropylene (melt viscosity 2,500 cp at 190° C.) is melted in a Brabender plastograph at 200° C. A solution of 1.13 grams (2.5 weight percent based on amorphous polypropylene) of Lupersol 101 in 15 ml of heptane is added to the molten polymer over a 10 minute period and the heptane is allowed to flash off. After about two hours processing time in the Brabender plastograph, the clear tacky polymer is stabilized with 0.2% Irganox 1010 stabilizer and has a melt viscosity of 650 cp at 190° C. This product is tacky after solidifying from the melt and it remains permanently tacky.

EXAMPLE 2

About 45 grams of low viscosity substantially amorphous polypropylene (melt viscosity 2,500 cp at 190° C.) is melted in the Brabender plastograph and treated with 2.25 grams (5 weight percent based on polymer) of Lupersol 101 according to the procedure of Example 1. The treated sample has a melt viscosity of 480 cp at 190° C. and it remains permanently tacky after solidification from the melt.

EXAMPLE 3

About 45 grams of low viscosity substantially amorphous polypropylene (melt viscosity 2,500 cp at 190° C.) is melted in the Brabender plastograph and treated with 4.5 grams (10 weight percent based on polymer) of Lupersol 101 according to the procedure of Example 1. The treated sample has a melt viscosity of 500 cp at 190° C. and it remains permanently tacky after solidification from the melt.

EXAMPLE 4

About 45 grams of low viscosity substantially amorphous polypropylene (melt viscosity 2,500 cp at 190° C.) is melted in the Brabender plastograph and treated with 9 grams (20 weight percent based on polymer) of Lupersol 101 according to the procedure of Example 1. The clear tacky polymer is stabilized with 0.2% Irganox 1010 and it has a melt viscosity of 2200 cp at 190° C. This material remains permanently tacky after solidifying from the melt. The polymer is heated to 177° C. and coated onto poly(ethylene terephthalate) film by means of a heated doctor blade to give a uniform one mil coating. The coated tape performs well as a pressure-sensitive tape material. For example, the polymer coating remains permanently tacky and it has good adhesion to paper, steel, polyethylene, and the like. When a torn page is mended with this tape, the printed matter under the tape is quite legible. Also this product may be used as a temporary adhesive for bonding polyethylene or latex backed carpeting to metal, such as in the bonding of carpeting to the floor panel of automobiles.

EXAMPLE 5

About 45 grams of low viscosity substantially amorphous polypropylene (melt viscosity 1700 cp at 190° C.) is melted in the Brabender plastograph and treated with 9 grams (20 weight percent based on polymer) of Lupersol 101 according to the procedure of Example 1. The clear tacky polymer is stabilized with 0.2% Irganox 1010 and it has a melt viscosity of 1400 cp at 190° C. Its properties are similar to those of the material described in Example 4.

EXAMPLE 6

About 39.2 grams of low viscosity substantially amorphous polypropylene (melt viscosity 2500 cp at 190° C.) and about 0.8 grams (2 weight percent) of degraded low viscosity crystalline polypropylene (melt viscosity 2100 cp at 190° C.) are melt blended in the Brabender plastograph at 200° C. Then 8 grams (20 weight percent) of Lupersol 101 is added according to the procedure of Example 1. The clear, tacky blend has a melt viscosity of 1,000 cp at 190° C. and it is permanently tacky after solidifying from the melt. Similarily good results are obtained when 20% crystalline polypropylene is used in the blend. Its pressure-sensitive adhesive properties are similar to those of the polymer described in Example 4. Blends containing greater than 20 weight percent crystalline polypropylene which are treated with peroxide have long open times after solidifying from the melt but they generally are not permanently tacky.

EXAMPLE 7

About 45 grams of low viscosity substantially amorphous poly(1-butene) (melt viscosity 2700 cp at 190° C.) is melted in the Brabender plastograph at 200° C. and treated with 4.5 grams (10 weight percent) of Lupersol 101 according to the procedure of Example 1. The treated sample has a melt viscosity of 850 cp at 190° C. and it is permanently tacky. Similar results are obtained when 20% Lupersol 101 is used.

EXAMPLE 8

About 45 grams of low viscosity substantially amorphous poly(50-propylene-co-50-1-butene) (melt viscosity 2400 cp at 190° C.) is melted in the Brabender plastograph at 200° C. and treated with 4.5 grams (10 weight percent) of Lupersol 101 according to the procedure in Example 1. The treated sample has a melt viscosity of 600 cp at 190° C. and it is permanently tacky.

EXAMPLE 9

About 45 grams of low viscosity substantially amorphous poly(50-propylene-co-50-1-butene) (melt viscosity 30,000 cp at 190° C.) is melted in a Brabender plastograph at 200° C. and treated with 4.5 grams (10 weight percent) of Lupersol 101 according to the procedure of Example 1. The treated sample has a melt viscosity of 20,000 cp at 190° C. and it is permanently tacky. This product has adhesive properties similar to that of the polymer described in Example 4.

EXAMPLE 10

About 45 grams of low viscosity substantially amorphous polypropylene (melt viscosity 2500 cp at 190° C.) is melted in the Brabender plastograph at 200° C. and treated with 2.25 grams (5 weight percent based on polymer) of cumene hydroperoxide according to the procedure of Example 1. The treated sample has a melt viscosity of 1800 cp at 190° C. The sample is permanently tacky but the degree of tack is much lower than that of the material treated with Lupersol 101.

EXAMPLE 11

About 45 grams of low viscosity substantially amorphous polypropylene (melt viscosity 2500 cp at 190° C.) is melted in a Brabender plastograph at 180° C. and 5.6 grams of DiCup 40C (40% dicumyl peroxide) is added to the molten polymer over a 10 minute period. After about two hours processing time in the Brabender plastograph, and tacky polymer is stabilized with 0.2% Irganox 1010 and it has a melt viscosity of 1100 cp at 190° C. This product is permanently tacky but the degree of tack is substantially lower than that obtained by treating amorphous polypropylene with the Lupersol 101-type peroxide.

EXAMPLE 12

A total of 200 grams of substantially amorphous polypropylene (melt viscosity 2800 cp at 190° C.) and 300 ml of benzene are placed in a 1 liter Parr autoclave. Ten grams of ditertiarybutyl peroxide and 25 ml of benzene are placed in a catalyst injector which is attached to the Parr autoclave. The autoclave is heated to 200° C. while the solution of substantially amorphous polypropylene and benzene is stirred. At 200° C., the ditertiarybutyl peroxide solution is injected into the reaction mixture and the solution is stirred for one hour at 200° C. The half life of ditertiarybutyl peroxide at 200° C. is about 30 seconds. The autoclave is allowed to cool. The solution is removed from the autoclave and the benzene is evaporated on the steam bath. The residual polymer, after evaporation of the benzene, is stabilized with 0.2% Irganox 1010. The clear, tacky polymer is permanently tacky after solidifying from the melt and it has a melt viscosity of 1700 cp at 190° C.

The modified amorphous polyolefins of this invention are useful in pressure-sensitive adhesives. As pressure-sensitive adhesives they find utility in preparing tapes by applying the adhesive by conventional hot melt procedures to a substrate such as a film which can be prepared from conventional film materials such as a polyester, for example. The pressure-sensitive adhesive can also be applied onto labels, decals, floor tile as well as wall covering, such as wall paper, and shelf coverings, such as shelf paper.

Although the invention has been described in considerable detail with particular reference to certain preferred embodiments thereof, variations and modifications can be effected within the spirit and scope of the invention.

We claim:

1. A process for preparing tacky modified amorphous polyolefin compositions useful as pressure sensitive adhesives which comprises reacting substantially amorphous polyolefin selected from the group consisting of substantially amorphous homopolymers of 1-olefins containing 3 to 5 carbon atoms, substantially amorphous copolymers prepared from either ethylene and 1-olefins containing 3 to 5 carbon atoms or propylene and 1-butene, and substantially amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene having a melt viscosity of about 100 to 200,000 at 190° C. with about 2 to 25 weight percent of at least one peroxide selected from the group consisting of ditertiarybutyl peroxide, 2,5-dimethyl-2,5-di(tertiarybutylperoxy)hexane, dicumyl peroxide, and cumene hydroperoxide at a temperature of 150° to 250° C. to provide a low viscosity, permanently tacky hot-melt pressure sensitive adhesive.

2. A process according to claim 1 wherein said peroxide is 2,5-dimethyl-2,5-di(tertiarybutylperoxy)hexane.

3. A process according to claim 1 wherein said peroxide is ditertiary butyl peroxide.

4. A process for preparing tacky modified amorphous polyolefin compositions useful as pressure sensitive adhesives which comprises reacting substantially amorphous polyolefin selected from the group consisting of substantially amorphous homopolymers of 1-olefins containing 3 to 5 carbon atoms, substantially amorphous copolymers prepared from either ethylene and 1-olefins containing 3 to 5 carbon atoms or propylene and 1-butene, and substantially amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene having a melt viscosity of about 100 to 200,000 at 190° C. with about 3 to 20 weight percent of least one peroxide selected from the group consisting of ditertiarybutyl peroxide, 2,5-dimethyl-2,5-2,5-di(tertiarybutylperoxy)hexane, dicumyl peroxide, and cumene hydroperoxide at a temperature of 150° to 250° C. to provide a low viscosity, permanently tacky hot-melt pressure sensitive adhesive.

5. A process according to claim 4 wherein said peroxide is 2,5-dimethyl-2,5-di(tertiarybutylperoxy)hexane.

6. A process according to claim 4 wherein said peroxide is ditertiary butyl peroxide.

7. A process for preparing tacky modified amorphous polyolefin compositions useful as pressure sensitive adhesives which comprises reacting substantially amorphous polyolefin selected from the group consisting of substantially amorphous homopolymers of 1-olefins containing 3 to 5 carbon atoms, substantially amorphous copolymers prepared from either ethylene and 1-olefins containing 3 to 5 carbon atoms or propylene and 1-butene, and substantially amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene having a melt viscosity of about 100 to 200,000 at 190° C. with about 3 to 20 weight percent of at least one peroxide selected from the group consisting of ditertiarybutyl peroxide, 2,5-dimethyl-2,5-di(tertiarybutylperoxy)hexane, dicumyl peroxide, and cumene hydroperoxide at a temperature of 175° to 225° C. to provide a low viscosity, permanently tacky hot-melt pressure sensitive adhesive.

8. A process according to claim 7 wherein said peroxide is 2,5-dimethyl-2,5-di(tertiarybutylperoxy)hexane.

9. A process according to claim 7 wherein said peroxide is ditertiary butyl peroxide.

10. A process for preparing tacky modified amorphous polyolefin compositions useful as pressure sensitive adhesives which comprises reacting substantially amorphous polyolefin selected from the group consisting of substantially amorphous homopolymers of 1-olefins containing 3 to 5 carbon atoms, substantially amorphous copolymers prepared from either ethylene and 1-olefins containing 3 to 5 carbon atoms or propylene and 1-butene, and substantially amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene having a melt viscosity of about 100 to 200,000 at 190° C. with about 3 to 20 weight percent of at least one peroxide selected from the group consisting of ditertiarybutyl peroxide, 2,5-dimethyl-2,5-di(tertiarybutylperoxy)hexane, dicumyl peroxide, and cumene hydroperoxide at a temperature of about 200° C. to provide a low viscosity, permanently tacky hot-melt pressure-sensitive adhesive.

11. A process according to claim 10 wherein said peroxide is 2,5-dimethyl-2,5-di(tertiarybutylperoxy)hexane.

12. A process according to claim 10 wherein said peroxide is ditertiary butyl peroxide.

* * * * *

UNITED STATES PATENT AND TRADEMARK OFFICE
CERTIFICATE OF CORRECTION

PATENT NO. : 4,112,208
DATED : September 5, 1978
INVENTOR(S) : Richard L. McConnell et al It is certified that error appears in the above-identified patent and that said Letters Patent are hereby corrected as shown below:

Column 7, lines 37 and 61, in each instance, "200,000" should read --- 200,000 cp. ---.

Column 8, line 3, "dimethyl-2,5,2,5-di(tertiarybutylperoxy)hexane," should read --- dimethyl-2,5-di(tertiarybutylperoxy)hexane, ---.

Column 8, lines 24 and 49, in each instance, "200,000" should read --- 200,000 cp. ---.

Signed and Sealed this

Twenty-fourth Day of April 1979

[SEAL]

Attest:

RUTH C. MASON
Attesting Officer

DONALD W. BANNER
Commissioner of Patents and Trademarks